April 1, 1958     E. W. SEEGER     2,829,328
BRAKING SYSTEMS FOR ELECTRIC MOTORS
Filed June 14, 1954

Inventor
Edwin W. Seeger
By Grover C. Frater
Attorney

United States Patent Office 2,829,328
Patented Apr. 1, 1958

2,829,328

BRAKING SYSTEMS FOR ELECTRIC MOTORS

Edwin W. Seeger, Wauwatosa, Wis., assignor to Cutler-Hammer, Inc., Milwaukee, Wis., a corporation of Delaware Application June 14, 1954, Serial No. 436,441

1 Claim. (Cl. 318—372)

This invention relates to braking systems for electric motors. In particular, it relates to systems in which motor braking is a function of motor de-energization and motor speeds.

A primary object of the invention is to provide reliable, simple and low cost motor braking systems.

A more specific object is to provide braking systems in which power is applied to the braking means only if the motor is de-energized and is rotating.

Various other objects and advantages of the invention will hereinafter appear.

Figure 1:
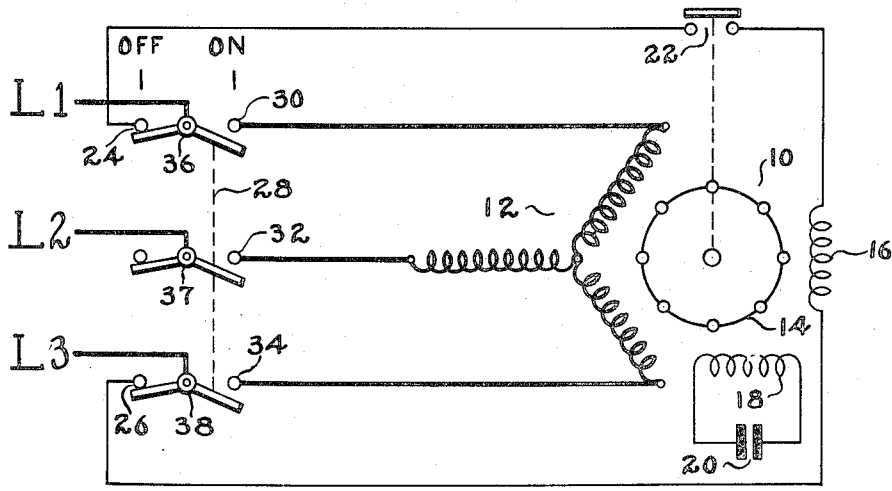
Figure 2:
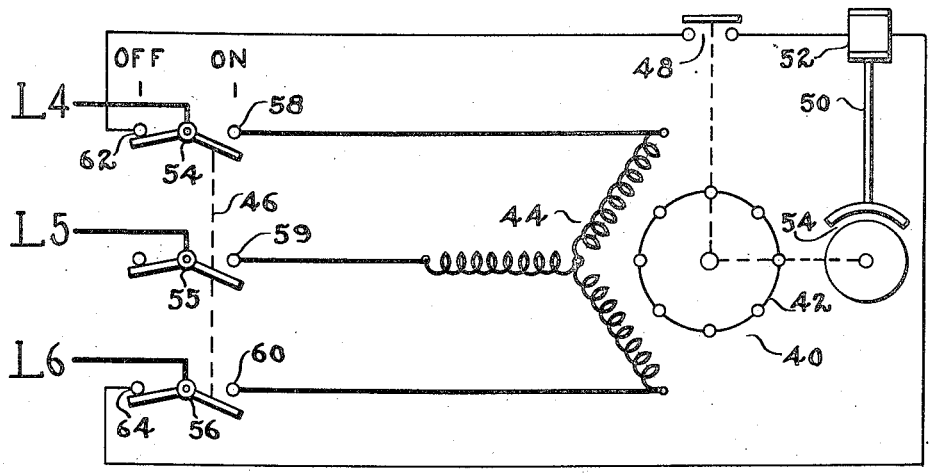

The accompanying drawing diagrammatically illustrates, in Figs. 1 and 2 respectively, two alternative braking systems for electric motors each of which embodies the invention. It is to be understood that certain modifications may be made in the embodiments illustrated and that other embodiments of the invention are possible without departing from the spirit of the invention or the scope of the appended claim.

There is shown, in Fig. 1, an alternating current motor 10 having three phase running windings 12, a rotor 14 and brake windings 16 and 18. Brake winding 18 is connected in loop circuit with a phase-shifting capacitor 20. The other brake winding 16 is connected in series circuit with the normally open contacts of a switch 22 across "off" contacts 24 and 26 of a power switch 28. "On" contacts 30, 32 and 34 of the switch 28 are connected to the respective terminals of running windings 12. The center poles 36, 37, 38 of power switch 28 are connected to a suitable three-phase alternating electrical power source represented by lines L1, L2 and L3.

When switch 28 is in "on" position, alternating power is applied from lines L1, L2 and L3 through poles 36, 37 and 38 to contacts 30, 32 and 34, respectively, and thence on to running windings 12 to operate the motor. Switch 22 is coupled to rotor 14 of the motor mechanically or through suitable motor-speed responsive, electrical means, and is responsive to close its contacts at a selected motor speed. It is now deemed to be preferable that switch 22 comprise a centrifugal force operated switch, mechanically coupled to the motor or its load and responsive to close its contacts at a very low motor speed.

Although switch 22 may be closed, brake winding 16 will not be energized unless contacts 24 and 26 are connected to the power source by setting switch 28 in "off" position.

When the motor is to be stopped, switch 28 is thrown to the "off" position. Power flow to running windings 12 is interrupted. Instead, power is applied through poles 36 and 38 and contacts 24 and 26 to the series circuit comprising switch 22 and brake winding 16. The current flow in winding 16 and induced current flow in winding 18 act to produce a torque which opposes coasting of the motor. When the motor speed is reduced below a selected value, switch 22 automatically opens its contacts to interrupt power flow to winding 16.

In Fig. 2 is shown a similar system which comprises a motor 40 having a rotor 42 and three-phase running windings 44; a power switch 46; a motor-speed responsive switch 48 having normally open contacts; a separate, electrically energizable motor brake 50; and a supply source represented by lines L4, L5 and L6. As shown, brake 50 may comprise an operating winding 52 and friction mechanism 54 coupled to the motor 40 and operative to brake the motor when winding 52 is energized.

When switch 46 is thrown to "on" position, power is applied to running windings 44 from lines L4, L5 and L6 through poles 54, 55 and 56 and contacts 58, 59 and 60 of said switch 46 and rotor 42 is turned. At a selected rotor speed, switch 48 closes its contacts to complete a series circuit through operating winding 52 from contact 62 to contact 64 of switch 46. This circuit is energized and running windings 44 are de-energized when switch 46 is thrown to "off" position. The contacts of switch 48 will remain closed to energize winding 52 for braking of the motor until the motor speed is reduced below a selected value at which the contacts of switch 48 are automatically opened.

In the drawings, power switches 28 and 46, of Figs. 1 and 2 respectively, are intended to be representative only. The power switch in either case may be a manual switch or may be an electromagnetic contactor or other magnetic or electronic switching means. Also it will be apparent that the invention is equally applicable to braking control of various forms of single or polyphase alternating power motors or of unidirectional power motors.

In both embodiments of the invention, when the power switch is in the "off" position and the speed responsive switch is open, the motor is entirely disconnected from the power source and no braking is applied so that the motor will "turn free." If it is desired that the motor be held against rotating while standing still, a conventional brake and brake control circuit may be added to the systems shown. The braking means shown in the drawing would slow the motor substantially to standstill so that the additional conventional brake need have only a small braking capacity.

I claim:

In combination, a source of electrical power, an electric motor and circuit means for connecting the motor to be energized for normal running from the power source, an electroresponsive mechanical brake associated with the motor and acting when energized to brake said motor, means to interrupt said circuit means and to connect the operating coil of said brake to the power source, and switch means responsive to motor speed and acting at motor speeds less than a selected speed to interrupt the connection of the operating coil of said brake to the power source.

References Cited in the file of this patent

UNITED STATES PATENTS

| | | |
|---|---|---|
| 869,356 | Fiedler | Oct. 29, 1907 |
| 1,849,847 | Mittnacht | Mar. 15, 1932 |
| 2,306,629 | Ludvigsen | Dec. 29, 1942 |
| 2,627,059 | Noodleman | Jan. 27, 1953 |
| 2,691,127 | Oliwa | Oct. 5, 1954 |